(12) United States Patent
Chiang et al.

(10) Patent No.: US 11,826,993 B2
(45) Date of Patent: Nov. 28, 2023

(54) THERMALLY CONDUCTIVE CURING PROCESS FOR COMPOSITE ROTORCRAFT STRUCTURE FABRICATION

(71) Applicant: Textron Innovations Inc., Providence, RI (US)

(72) Inventors: Thomas S. Chiang, Dallas, TX (US); Jared M. Paulson, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 340 days.

(21) Appl. No.: 16/281,960

(22) Filed: Feb. 21, 2019

(65) Prior Publication Data
US 2020/0269556 A1    Aug. 27, 2020

(51) Int. Cl.
*B29K 105/16*    (2006.01)
*B29K 507/04*    (2006.01)
(Continued)

(52) U.S. Cl.
CPC ........ *B32B 27/20* (2013.01); *B29C 66/91443* (2013.01); *B29C 70/48* (2013.01);
(Continued)

(58) Field of Classification Search
CPC . B32B 27/20; B32B 2264/10; B32B 2605/18; B32B 2307/302; B32B 5/26; B32B 2250/02; B32B 2250/20; B32B 2260/046; B32B 2262/02; B32B 2262/023; B32B 2262/0269; B32B 2262/101; B32B 2262/106; B32B 2264/102; B32B 2264/105; B32B 2264/1052;
(Continued)

(56) References Cited

U.S. PATENT DOCUMENTS 2,636,539 A * 4/1953 Pajak .................... B32B 37/00
425/62
2,901,455 A * 8/1959 Jurras .................... C08L 63/00
428/76
(Continued)

FOREIGN PATENT DOCUMENTS

WO      2005124790 A2    12/2005
WO      WO-2019016500 A1 *  1/2019    ......... B29C 35/0272

*Primary Examiner* — Michael A Tolin
(74) *Attorney, Agent, or Firm* — WHITAKER CHALK SWINDLE & SCHWARTZ PLLC; Enrique Sanchez, Jr.

(57) ABSTRACT

A thermally conductive curing process adds conductive additives to create pathways for dissipating heat during a curing process, thereby reducing the cure time, increasing the output capability, and reducing cost. Conductive particles or short fibers can be dispersed throughout the resin system or composite fiber layers in pre-impregnated or RTM-processed composite material. By disposing conductive particles or short fibers in a resin as part of the curing process, heat generated during the curing process can dissipate more quickly from any type of composite, especially thick composites. Conductive additive examples include multi-walled carbon nanotubes (MWCNTs), single-walled carbon nanotubes (SWCNTs), graphene/graphite powder, buckyballs, short fibrous particulate, nano-clays, nano-particles, and other suitable materials.

13 Claims, 3 Drawing Sheets

(51) Int. Cl.
*B32B 27/20* (2006.01)
*B29C 70/44* (2006.01)
*B29C 70/48* (2006.01)
*B29C 65/00* (2006.01)
*B29L 31/30* (2006.01)

(52) U.S. Cl.
CPC .. *B29K 2105/162* (2013.01); *B29K 2105/167* (2013.01); *B29K 2507/04* (2013.01); *B29K 2995/0013* (2013.01); *B29L 2031/3076* (2013.01); *B32B 2264/10* (2013.01); *B32B 2307/302* (2013.01); *B32B 2605/18* (2013.01)

(58) Field of Classification Search
CPC ...... B32B 2264/1055; B32B 2264/108; B32B 2307/202; B32B 2307/706; B32B 2603/00; B29C 70/48; B29C 35/02; B29C 35/0227; B29C 35/0288; B29C 70/025; B29C 70/42; B29C 70/44; B29C 70/443; B29C 70/88; B29C 70/882; B29C 66/91441; B29C 66/91443; B29C 66/91445; B29K 2995/0013; B29K 2507/04; B29K 2105/162; B29K 2105/167; B29K 2505/00; B29K 2505/02; B29K 2505/10; B29K 2995/0005; B29L 2031/3076
USPC ......................................................... 156/311
See application file for complete search history.

(56) References Cited

U.S. PATENT DOCUMENTS

| | | | |
|---|---|---|---|
| 5,403,537 A * | 4/1995 | Seal | B29C 70/547 |
| | | | 264/511 |
| 7,013,965 B2 | 3/2006 | Zhong et al. | |
| 9,213,009 B2 | 12/2015 | Bishop et al. | |
| 9,701,403 B2 | 7/2017 | Kizhakkepat et al. | |
| 2004/0069454 A1 | 4/2004 | Bonsignore et al. | |
| 2005/0086916 A1* | 4/2005 | Caron | B29C 70/544 |
| | | | 55/382 |
| 2005/0236606 A1* | 10/2005 | Toas | C04B 30/02 |
| | | | 252/601 |
| 2005/0277349 A1 | 12/2005 | Smith et al. | |
| 2005/0277351 A1 | 12/2005 | Smith et al. | |
| 2008/0066942 A1* | 3/2008 | Miller | H01B 3/04 |
| | | | 174/36 |
| 2010/0021682 A1 | 1/2010 | Liang et al. | |
| 2013/0207029 A1* | 8/2013 | Janssen | C08K 3/04 |
| | | | 252/75 |
| 2015/0184333 A1* | 7/2015 | Arai | C08J 5/06 |
| | | | 428/327 |
| 2015/0274911 A1* | 10/2015 | Suzuki | B32B 5/26 |
| | | | 428/414 |
| 2015/0299408 A1* | 10/2015 | Nguyen | H01B 1/20 |
| | | | 428/300.1 |
| 2016/0107739 A1* | 4/2016 | Restuccia | B32B 5/26 |
| | | | 428/114 |

* cited by examiner

THERMALLY CONDUCTIVE CURING PROCESS FOR COMPOSITE ROTORCRAFT STRUCTURE FABRICATION

BACKGROUND

1. Field of the Invention

The present disclosure is generally related to a thermally conductive curing process, and more specifically to a curing process using conductive additives to create pathways for dissipating heat during curing.

2. Background of the Invention and Description of Related Art

Materials engineering is quickly advancing, allowing for the fabrication of stronger, lighter components for use in aerospace applications where strength and weight are critical issues. Thick composite laminate materials provide both strength, weight reduction, and flexibility necessary for specific applications. Composite materials are widely applied in the aerospace industry and a majority of these composite parts require lengthy cure cycles in their fabrication. A plurality of significant dwell times are typically employed to control heat generated during the exothermic reaction, which can damage the composite parts. In the case of thick composites, some cure cycles can extend for 20 hours or more.

A component of any significant thickness requires a substantial amount of time to cure due to exothermic reaction within thermoset resins and thermosetting composites. The chemical reactions involved in the curing process can create undesirable heat that can build up in a curing component. Heat generated during polymerization, or cross-linking, if left unmanaged, can lead to negative consequences. Although polymer chains cross-link and strengthen, a negative consequence of that reaction can be uncontrolled heat generation. Many composite laminates are fiberglass reinforced, limiting the thermal conductivity of the laminate. Thick laminates can generate enough exothermic heat to thermally degrade, damage, or destroy the curing component.

SUMMARY

The present disclosure teaches technical advantages of a thermally conductive curing process including conductive additives to create pathways for dissipating heat during a curing process, thereby reducing the cure time, increasing the output capability, and reducing cost. Conductive particles or short fibers can be dispersed throughout the resin system or composite ply layers in pre-impregnated or RTM-processed composite material. By disposing conductive particles or short fibers in a resin as part of the material forming or part fabrication process, heat generated during the curing process can dissipate more quickly from any type of composite, especially thick composites. Conductive additive examples include multi-walled carbon nanotubes (MWCNTs), single-walled carbon nanotubes (SWCNTs), graphene/graphite powder, buckyballs, short fibrous particulate, nano-clays, nano-particles, and other suitable materials. A controller can control the cure cycle and the heating mechanism.

In one exemplary embodiment, a thermally conductive curing process can include: assembling a composite preform using a plurality of composite fiber layers; disposing conductive additives in a resin; injecting the conductive resin between the plurality of composite layers; subjecting the composite preform to a curing cycle; wicking away the heat from the composite preform layers via the conductive resin, such as the conductive pathways created by the conductive particles or short fibers disposed in the resin; maintaining a temperature of the composite layers below a predetermined threshold; and minimizing or eliminating temperature dwell times. The composite preform can be an aircraft structure. The composite fiber layers can include plastic, carbon, aramid, fiberglass, or other suitable material. The resin can be polyester, epoxy, polyimide, bismaleimide, or other suitable material. The conductive additives can include conductive particles or conductive short fibers. The conductive particles can include graphene powder, graphite powder, buckyballs, nano-clays, nano-particles, or other suitable material. The conductive short fibers can include multi-walled carbon nanotubes (MWCNTs), single-walled carbon nanotubes (SWCNTs), short fibrous particulate, or other suitable material. The method can further include disposing a bagging material over the composite fiber layers to facilitate a vacuum compaction for material bonding. The bagging material can be sealably coupled to and/or around the composite fiber layers. The composite fiber layers can also be placed within a sealable bagging material. The conductive additives can be dispersed at a surface level between the bagging material and the composite fiber layers. The conductive additives can be disposed within the bagging material. The bagging material can be made to seal over or around the composite fiber layers.

In another exemplary embodiment, a thermally conductive curing process can include: disposing a conductive resin between a plurality of composite layers; curing the composite preform in a heating mechanism; wicking away the heat from the composite layers via the conductive resin; and maintaining a temperature of the composite layers below a predetermined threshold without temperature dwell times. The composite preform can be an aircraft structure. The heating mechanism can be an autoclave, oven, or press. The composite fiber layers can include plastic, carbon, aramid, fiberglass, or other suitable material. The resin can be polyester, epoxy, polyimide, bismaleimide, or other suitable material. The conductive additives can include conductive particles or conductive short fibers. The conductive particles can include graphene powder, graphite powder, buckyballs, nano-clays, nano-particles, or other suitable material. The conductive short fibers can include multi-walled carbon nanotubes (MWCNTs), single-walled carbon nanotubes (SWCNTs), short fibrous particulate, or other suitable material. The method can further include disposing a bagging material over the composite fiber layers to facilitate a vacuum compaction for material bonding. The conductive additives can be dispersed at a surface level between the bagging material and the composite fiber layers. The conductive additives can be disposed within the bagging material.

In another exemplary embodiment, a composite aircraft structure, can include a first composite fiber layer of an aircraft structure; a second composite fiber layer of the aircraft structure; and a conductive resin disposed between the first composite fiber layer and the second composite fiber layer, wherein the conductive resin includes conductive additives, that wick away heat from the aircraft structure via conductive pathways created by the conductive additives. The composite fiber layers can include plastic, carbon, aramid, fiberglass, or other suitable material. The resin can be polyester, epoxy, polyimide, bismaleimide, or other suitable material. The conductive additives can include conductive particles or conductive short fibers. The conductive particles can include graphene powder, graphite powder, buckyballs, nano-clays, nano-particles, or other suitable material. The conductive short fibers can include multi-walled carbon nanotubes (MWCNTs), single-walled carbon nanotubes (SWCNTs), short fibrous particulate, or other suitable material.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1B:
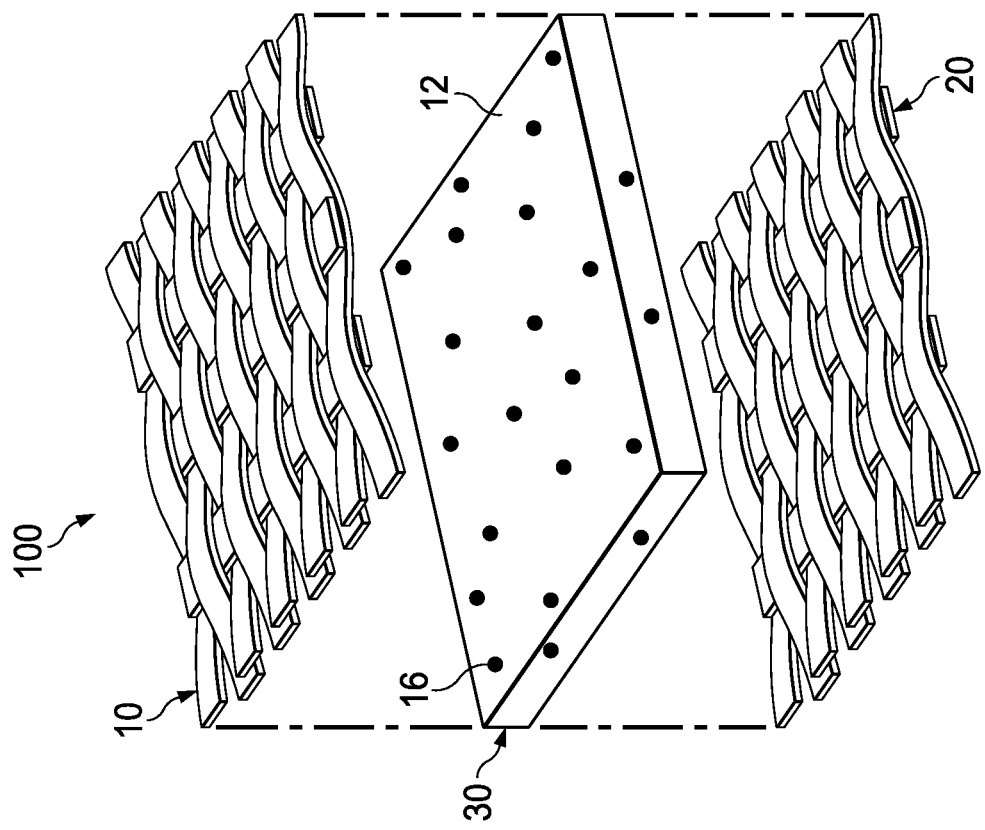
FIG. 1B is an exploded view of a composite rotorcraft structure, in accordance with another embodiment of the present disclosure.
Figure 1A:
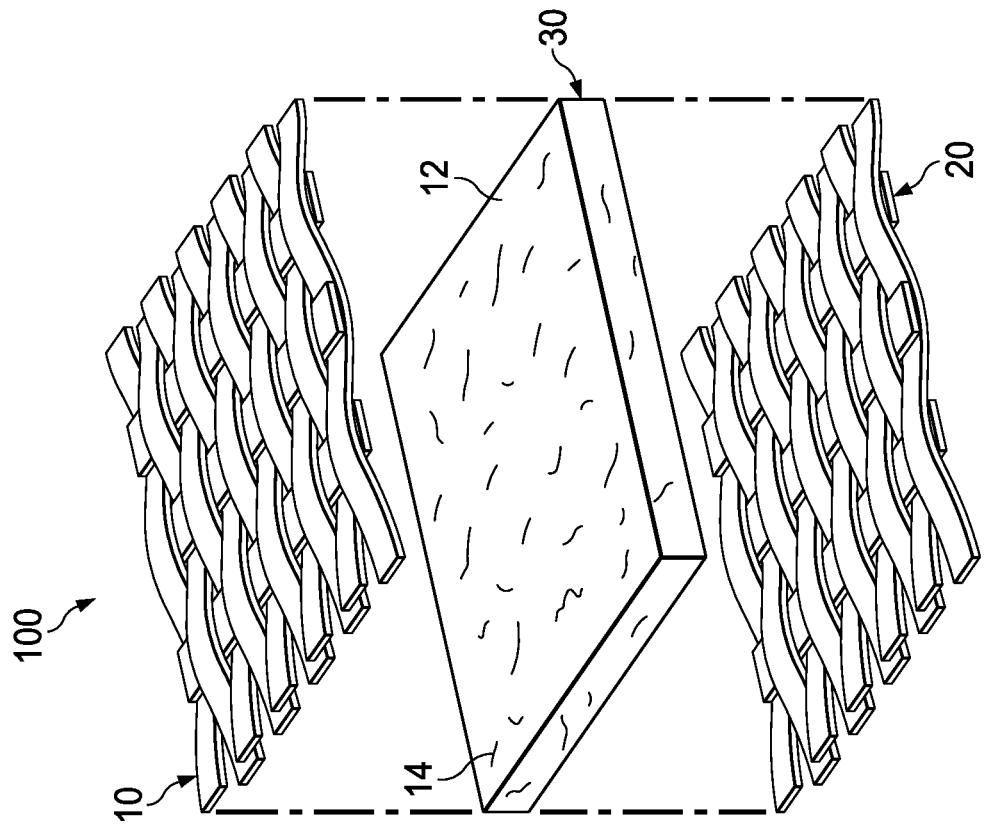
FIG. 1A is an exploded view of a composite rotorcraft structure, in accordance with an embodiment of the present disclosure.

FIG. 1A is an exploded view of a composite rotorcraft structure, generally designated as 100, in accordance with an embodiment of the present disclosure. The composite structure 100 can include a first composite fiber layer 10, a second composite fiber layer 20, and a resin layer 30. The composite structure can include one or more composite layers and one or more resin layers 30. The fiber layer 10 can include plastic, carbon, aramid, fiberglass, or other suitable material. The resin layer 30 can include a matrix resin 12, such as polyester, epoxy, polyimide, or bismaleimide. Advantageously, the resin layer 30 can also include conductive additives, such as conductive short fibers 14. The conductive short fibers 14 can be multi-walled carbon nanotubes (MWCNTs), single-walled carbon nanotubes (SWCNTs), short fibrous particulate, or other suitable material. The resin layer 30, having conductive additives disposed therein, can wick away the heat from the composite fiber layers via conductive pathways created by the conductive short fibers 14 disposed in the resin layer 30. Many discrete pathways can be created by individual thermally conductive fibers or particles through the thickness of the laminate and at the surface near any bagging material, as well as across each layer. It may be anisotropic in the case of S/MWNTs or, depending on the processing method employed, a functional gradient in thermal conductivity within or across the cured part may be possible.

In one embodiment, the fabrication can include pre-impregnated materials that include composite fiber layers with a resin pre-disposed on each layer. Pre-impregnated fibers can include a doped resin with additives to provide uniform dispersion of the additive. Multiple layers can be laid up to the desired specification and the curing process can begin. The layers can be compacted or uncompacted. In another embodiment, the fabrication can include resin transfer molding, where multiple dry fiber layers can be laid-up to the desired specification, and resin can then be applied, wetted, injected, or otherwise disposed between each layer thereafter. The layers can be compacted or uncompacted. The curing process can then begin.

FIG. 1B is an exploded view of a composite rotorcraft structure 100, in accordance with another embodiment of the present disclosure. The composite structure 100 can include a first composite fiber layer 10, a second composite fiber layer 20, and a resin layer 30. The composite structure can include one or more composite layers and one or more resin layers 30. The fiber layer 10 can include plastic, carbon, aramid, fiberglass, or other suitable material. The resin layer 30 can include a matrix resin 12, such as polyester, epoxy, polyimide, or bismaleimide. Advantageously, the resin layer 30 can also include conductive additives, such as conductive particles 16. The conductive particles 16 can be graphene powder, graphite powder, buckyballs, nano-clays, nano-particles, or other suitable material. The resin layer 30, having conductive additives disposed therein, can wick away the heat from the composite fiber layers via conductive pathways created by the conductive particles 16 disposed in the resin layer 30. Many discrete pathways can be created by individual thermally conductive fibers or particles through the thickness of the laminate and at the surface near any bagging material, as well as across each layer. It may be anisotropic in the case of S/MWNTs or, depending on the processing method employed, a functional gradient in thermal conductivity within or across the cured part may be possible.

In one embodiment, the fabrication can include pre-impregnated materials that include composite fiber layers with a resin pre-disposed on each layer. Multiple layers can be laid-up to the desired specification and the curing process can begin. The layers can be compacted or uncompacted. In another embodiment, the fabrication can include resin transfer molding, where multiple dry fiber layers can be laid-up to the desired specification, and resin can then be injected between each layer thereafter. The layers can be compacted or uncompacted. The curing process can then begin.

Figure 2:
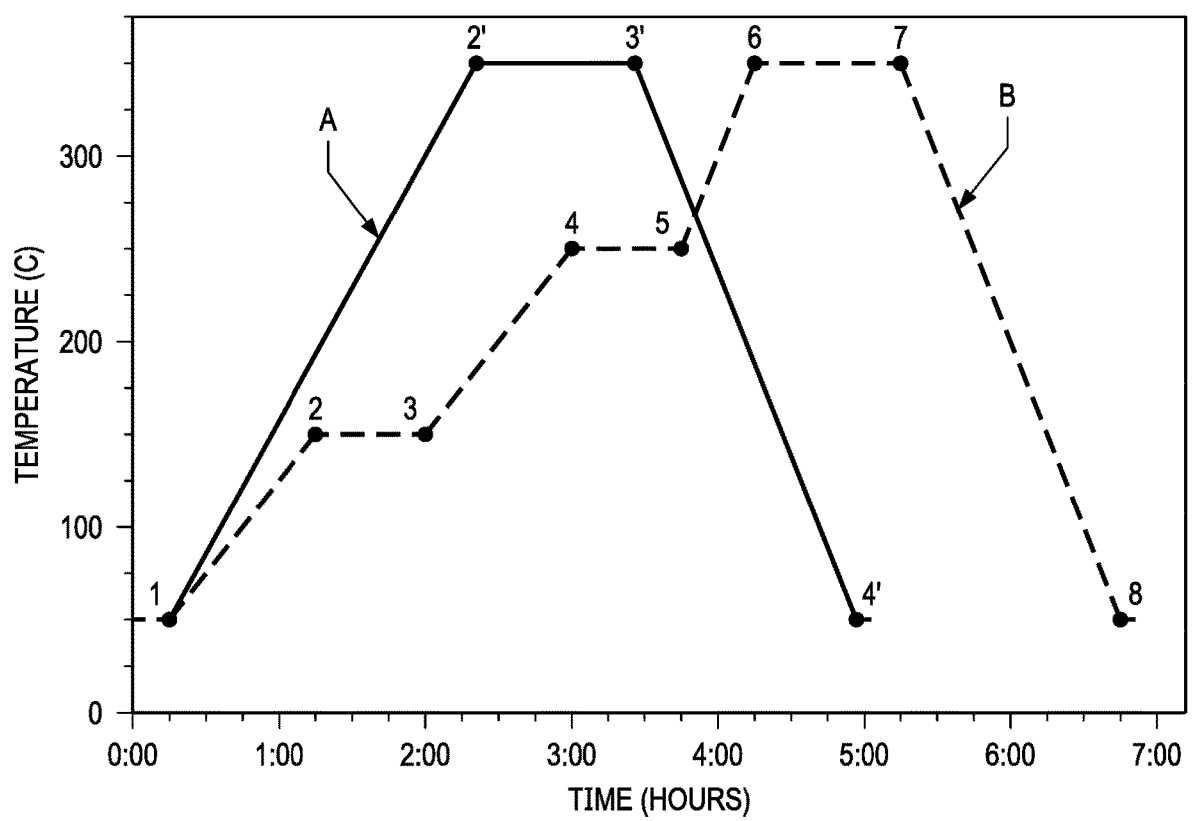
FIG. 2 is a graph of two curing cycles in accordance with an embodiment of the present disclosure, and a graph of a curing cycle in accordance with the prior art.

FIG. 2 is a graph of two curing cycles, generally designated as 200, in accordance with an embodiment of the present disclosure, and a graph of a curing cycle in accordance with the prior art. When at room temperature or below, the kinetics of a resin matrix are slowed substantially. The curing process heats the resin matrix to increase the cure kinetics and decrease the set-time of the resin matrix. After a time, a fully-cured composite structure can be achieved. Heat can be administered to an uncured composite structure via a heating mechanism, such as an autoclave, oven, press, or other suitable mechanism. Since heat and/or stresses can build up during the curing process, the curing process can be staged to dissipate the heat and/or stresses on the composite structure. In the graph 200, two curing cycles are shown according to a prior art cure cycle B (shown in dashed-lines) and a cure cycle A (shown in solid-lines) according to the present disclosure. In one exemplary embodiment, the cure cycles are for the same composite structure, such as a yoke. Once the composite structure is laid up with composite fiber layers with resin layers disposed therebetween, the composite structure can be placed in the heating mechanism. The heating mechanism can then generate heat, which can be directed toward the composite structure.

With regard to the prior art cure cycle B, initially, the temperature of the heating mechanism can be held constant at a first temperature until a first time 1. The temperature of the heating mechanism can be raised until a second time 2. At time 2, the prior art cure cycle B must stop raising the temperature and "dwell" at a second temperature to mitigate the build-up of heat that can damage the composite structure. At a third time 3, the heating mechanism can continue to raise the temperature until a fourth time 4. At time 4, the prior art cure cycle B must again cease the raising of the temperature and "dwell" at a third temperature to again mitigate the build-up of heat that can damage the composite structure. At a fifth time 5, the heating mechanism can continue to raise the temperature until a sixth time 6. At time 6, the prior art cure cycle B must yet again cease the raising of the temperature and "dwell" at a third temperature to yet again mitigate the build-up of heat that can damage the composite structure. At a seventh time 7, the temperature of the heating mechanism can be decreased until an eighth time 8, where the composite structure can be fully-cured. As can be seen the need to interrupt the curing cycle to add dwell times can significantly impact the cure time of the composite part, resulting in wasted time, reduced curing output, and wasted energy usage.

With regard to the cure cycle A of the present disclosure, initially, the temperature of the heating mechanism can be held constant at a first temperature until a first time 1. The temperature of the heating mechanism can then be raised until a second time 2'. At time 2', the cure cycle A of the present disclosure ceases the raising of the temperature and "dwells" at a second temperature to mitigate the build-up of heat. At a third time 3', the temperature of the heating mechanism is decreased until a fourth time 4', where the composite structure can be fully-cured. Since the resin matrix of the composite structure includes the conductive additive, the heat build-up in the composite material is wicked away more quickly, minimizing or eliminating temperature dwell times. Although FIG. 2 shows one embodiment of the two cure cycles, any temperature, time-period, or dwell time is contemplated.

Intermediate "hot" compactions can compact the composite fiber layers during the cure cycle. In another embodiment, a bagging material can be disposed over the layers to facilitate vacuum compaction for material bonding. In one exemplary embodiment, the conductive additives (particles or short fibers) can be dispersed at a surface level between the bagging material and the composite structure. Alternatively, the conductive additives can be disposed within the bagging material. The conductive additives, related to the bagging material, can be used to speed-up any intermediate hot compactions in addition to the curing process.

Figure 3:
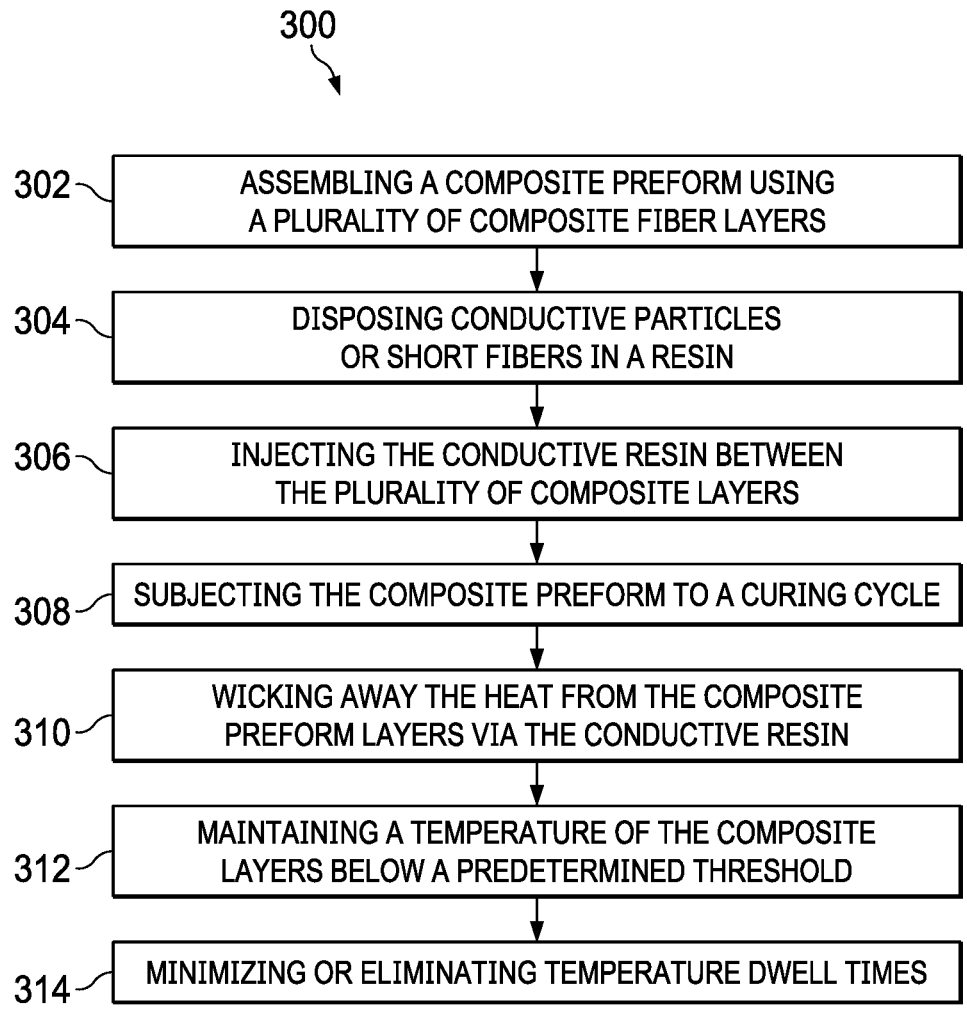
FIG. 3 is a flowchart of a thermal conductivity enhancement process for composite rotorcraft structure fabrication, in accordance with an embodiment of the present disclosure.

FIG. 3 is a flowchart of a thermal conductivity enhancement process 300 for composite rotorcraft structure fabrication, in accordance with an embodiment of the present disclosure. One or more steps of the process 300 can be implemented as an algorithm on a general-purpose computing platform or other suitable microprocessor-based system. The process 300 begins at 302, where a composite preform can be assembled using a plurality of composite fiber layers. The composite fiber layers can include plastic, carbon, aramid, fiberglass, or other suitable material. The composite preform can be an aircraft structure, such as a yoke, grip, blade spar, rotor blade, wing, etc. The method then proceeds to step 304.

At step 304, conductive particles or short fibers can be disposed in a resin. The resin can include polyester, epoxy, polyimide, bismaleimide, or other suitable material. Advantageously, the resin can also include conductive additives, such as conductive particles or conductive short fibers. The conductive particles can be graphene powder, graphite powder, buckyballs, nano-clays, nano-particles, or other suitable material. The conductive short fibers can be multi-walled carbon nanotubes (MWCNTs), single-walled carbon nanotubes (SWCNTs), short fibrous particulate, or other suitable material. The method then proceeds to step 306.

At step 306, the conductive resin can be injected between the plurality of composite fiber layers. Alternatively, the resin can be pre-impregnated on the composite fiber layers. The method then proceeds to step 308.

At step 308, the composite preform is subjected to a curing cycle. In one embodiment, heat can be administered to an uncured composite structure during the curing cycle via a heating mechanism. The heating mechanism can be an autoclave, oven, press, or other suitable mechanism for generating heat. The method then proceeds to step 310.

At step 310, heat is wicked away from the composite preform layers via the conductive resin. Since the resin between the preform layers includes the conductive particles or short fibers, the heat build-up can be wicked away more quickly. Advantageously, the heat can be drawn out of the composite preform layers via the conductive pathways created by the conductive particles or short fibers disposed in the resin. The method then proceeds to step 312.

At step 312, a temperature of the composite layers can be maintained below a predetermined threshold. The wicking away of the heat caused by the conductive particles or short fibers allows the heat within the composite fiber layers to stay below a predetermined threshold. In one embodiment, the threshold can be determined based upon the type of conductive particles or short fibers disposed within the resin. In another embodiment, the predetermined threshold is the temperature at which the composite fiber layers become damaged. The type of conductive particles or short fibers utilized in the resin and/or the distribution can be input into the processor to control the heating mechanism and identify temperature thresholds. The method then proceeds to step 314.

At step 314, the temperature dwell times of the heating mechanism can be minimized or eliminated. Typical heating mechanisms can implement sensors at predetermined points within the composite fiber layers to control the heating mechanism and introduce dwell times. Since the temperature of the composite layers is maintained below a predetermined threshold due to the wicking away of the heat by the conductive particles or short fibers, the dwell times can be minimized or eliminated. In one exemplary embodiment, only one temperature dwell time is realized during the curing process. In another exemplary embodiment, there are fewer dwell times during the curing of a particular component having the conductive resin than there are for the same component without the conductive resin.

A controller can control the cure cycle and the heating mechanism of the present disclosure. The controller can be implemented in hardware, software, or a suitable combination of hardware and software and may comprise one or more software systems operating on a digital signal processing platform or other suitable processing platforms. As used herein, "hardware" can include a combination of discrete components, an integrated circuit, a microprocessor, a controller, a microcontroller, an application-specific integrated circuit (ASIC), an electronic data processor, a computer, a field programmable gate array (FPGA), or other suitable hardware connectable for interfacing with a network, considered to be well-known in the art. As used herein, "software" can include one or more objects, agents, threads, lines of code, subroutines, separate software applications, two or more lines of code or other suitable software structures operating in two or more software applications or on two or more processors, or other suitable hardware structures. Furthermore, it can be considered that the design, development, and implementation details of all such hardware and software would be apparent to a person having ordinary skill in the art based upon a review of the present description. In one embodiment, software can include one or more lines of code or other suitable software structures operating in a general-purpose software application, such as an operating system, and one or more lines of code or other suitable software structures operating in a specific purpose software application.

The present disclosure achieves at least the following advantages:

1. the conductive particles or short fibers can enhance the thermal conductivity of the thermosetting laminates, leading to more efficient thermal flow during part cure;
2. the ability to more efficiently dump temperature that builds during the exothermic reaction could reduce cure times by reducing the number of staging cures or increasing the cure kinetics without suffering thermal degradation;
3. composite parts incorporating the conductive particles or short fibers can increase thermal flow to cool down faster, such as those parts that are exposed to extra heat around engine exhaust, heater blanket, etc.;
4. decreased part cure times yields increased production throughput; and
5. cost savings due to mitigation of composite structure damage from curing.

While the disclosure has described a number of embodiments, it is not thus limited and is susceptible to various changes and modifications without departing from the spirit thereof. In particular, although a certain cure process was disclosed in some of the embodiments and figures described herein, any suitable cure process can be implemented. Persons skilled in the art will understand that this concept is susceptible to various changes and modifications, and can be implemented or adapted readily to other types of environments. Further, the individual elements of the claims are not well-understood, routine, or conventional. Instead, the claims are directed to the unconventional inventive concept described in the specification.

What is claimed is:

1. A thermally conductive curing process, comprising:
    assembling a composite preform using a plurality of composite fiber layers;
    disposing at least a first portion of conductive additives in a resin to form a conductive resin;
    injecting the conductive resin between the plurality of composite fiber layers;
    disposing at least a second portion of the conductive additives, without the conductive resin, as a surface layer between a bagging material and the plurality of composite fiber layers, wherein the surface layer is separate from the bagging material and the plurality of composite fiber layers;
    disposing the bagging material over the plurality of composite fiber layers to facilitate a vacuum compaction for material bonding;
    subjecting the composite preform to a curing cycle;
    wicking away heat from the composite preform via the conductive resin;
    maintaining a temperature of the plurality of composite fiber layers below a predetermined threshold; and
    minimizing or eliminating temperature dwell times,
    wherein the curing cycle includes:
        holding a heating temperature constant until a first time,
        raising the heating temperature until a second time,
        ceasing the raising of the heating temperature and dwelling at a second temperature to mitigate the build-up of heat, and
        decreasing the heating temperature at a third time to a final temperature, wherein the final temperature is lower than the second temperature.

2. The curing process of claim 1, wherein the composite preform is an aircraft structure.

3. The curing process of claim 1, wherein the plurality of composite fiber layers includes plastic fibers, carbon fibers, aramid fibers, or glass fibers.

4. The curing process of claim 1, wherein the resin is polyester, epoxy, polyimide, or bismaleimide.

5. The curing process of claim 1, wherein the conductive additives include conductive particles or conductive short fibers.

6. The curing process of claim 5, wherein the conductive particles include graphene powder, graphite powder, buckyballs, nano-clays, or nano-particles.

7. The curing process of claim 5, wherein the conductive short fibers include multi-walled carbon nanotubes (MWCNTs), single-walled carbon nanotubes (SWCNTs), or short fibrous particulate.

8. A thermally conductive curing process, comprising:
    disposing at least a first portion of conductive additives in a resin to form a conductive resin;
    disposing the conductive resin between a plurality of composite layers;
    disposing at least a second portion of the conductive additives, without the conductive resin, as a surface layer between a bagging material and the plurality of composite fiber layers, wherein the surface layer is separate from the bagging material and the plurality of composite fiber layers
    disposing the bagging material over the plurality of composite fiber layers to facilitate a vacuum compaction for material bonding;
    curing a composite preform comprising the plurality of composite fiber layers in an autoclave, oven, or press;
    wicking away heat from the plurality of composite layers via the conductive resin; and
    maintaining a temperature of the plurality of composite layers below a predetermined threshold without temperature dwell times,
    wherein the curing cycle includes:
        holding a heating temperature constant until a first time,
        raising the heating temperature until a second time,
        ceasing the raising of the heating temperature and dwelling at a second temperature to mitigate the build-up of heat, and
        decreasing the heating temperature at a third time to a final temperature, wherein the final temperature is lower than the second temperature.

9. The curing process of claim 8, wherein the composite preform is an aircraft structure.

10. The curing process of claim 8, wherein the resin is polyester, epoxy, polyimide, or bismaleimide.

11. The curing process of claim 8, wherein the conductive additives include conductive particles or conductive short fibers.

12. The curing process of claim 11, wherein the conductive particles include graphene powder, graphite powder, buckyballs, nano-clays, or nano-particles.

13. The curing process of claim 11, wherein the conductive short fibers include multi-walled carbon nanotubes (MWCNTs), single-walled carbon nanotubes (SWCNTs), or short fibrous particulate.

* * * * *